(12) United States Patent
Brand

(10) Patent No.: US 10,907,409 B2
(45) Date of Patent: *Feb. 2, 2021

(54) MUD MOTORS WITH THRUST BEARING WITH ENHANCED TORQUE

(71) Applicant: Marcel Brand, Braunschweig (DE)

(72) Inventor: Marcel Brand, Braunschweig (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,512

(22) Filed: Oct. 25, 2019

(65) Prior Publication Data

US 2020/0056428 A1 Feb. 20, 2020

Related U.S. Application Data

(63) Continuation of application No. 15/399,245, filed on Jan. 5, 2017, now Pat. No. 10,458,185.

(51) Int. Cl.
| | |
|---|---|
| E21B 4/00 | (2006.01) |
| E21B 4/02 | (2006.01) |
| F16C 19/18 | (2006.01) |
| F16C 33/58 | (2006.01) |
| F16C 43/04 | (2006.01) |
| F16C 33/60 | (2006.01) |

(52) U.S. Cl.
CPC .............. *E21B 4/003* (2013.01); *E21B 4/02* (2013.01); *F16C 19/18* (2013.01); *F16C 33/58* (2013.01); *F16C 33/60* (2013.01); *F16C 43/04* (2013.01); *F16C 2352/00* (2013.01)

(58) Field of Classification Search
CPC .......... E21B 4/003; F16C 33/60; F16C 33/605
See application file for complete search history.

(56) References Cited

U.S. PATENT DOCUMENTS

| | | |
|---|---|---|
| 1,001,764 A | 8/1911 | Linn |
| 1,250,805 A | 12/1917 | Cooper |
| 1,356,326 A | 10/1920 | Wingquist |
| 1,546,363 A | 7/1925 | Beemer |
| 1,843,292 A | 2/1932 | Medved |
| 1,884,925 A | 10/1932 | Vanderbeek |
| 1,909,525 A | 5/1933 | Curtis |

(Continued)

FOREIGN PATENT DOCUMENTS

| | | |
|---|---|---|
| EP | 2508767 A1 | 10/2012 |
| WO | 2014066609 A1 | 5/2014 |

OTHER PUBLICATIONS

PCT International Search Report and Written Opinion; International Application No. PCT/US2017/067777; International Filing Date: Dec. 21, 2017; dated Apr. 16, 2018; pp. 1-14.

*Primary Examiner* — Giovanna Wright
(74) *Attorney, Agent, or Firm* — Cantor Colburn LLP

(57) ABSTRACT

An apparatus for use in a wellbore is disclosed that in one non-limiting embodiment includes a rotatable member, a thrust bearing coupled to the rotatable member, wherein the thrust bearing includes a bearing stack that further includes a unitary inner race member that includes a number of axially spaced inner races around an outer surface of the unitary inner race member. A set of bearing elements is placed in each inner race, and a separate outer race secures each set of bearing elements in each inner race.

13 Claims, 3 Drawing Sheets

(56) References Cited

U.S. PATENT DOCUMENTS

| | | |
|---|---|---|
| 1,966,095 A | 7/1934 | Herrmann |
| 1,982,896 A | 12/1934 | Ackerman |
| 2,130,258 A | 9/1938 | Baker et al. |
| 2,460,910 A | 2/1949 | Sheets |
| 3,549,220 A | 12/1970 | Robinson et al. |
| 3,934,957 A | 1/1976 | Derner |
| 4,509,871 A | 4/1985 | Herzog et al. |
| 4,511,193 A | 4/1985 | Geczy |
| 4,518,049 A | 5/1985 | Baldenko et al. |
| 4,854,750 A | 8/1989 | Lavin |
| 5,086,851 A | 2/1992 | Beasley |
| 5,248,204 A | 9/1993 | Livingston et al. |
| 5,690,434 A | 11/1997 | Beshoory et al. |
| 5,807,180 A | 9/1998 | Knodle |
| 6,361,217 B1 | 3/2002 | Beasley |
| 7,309,163 B2 | 12/2007 | Dass |
| 7,445,061 B1 | 11/2008 | Falgout, Sr. et al. |
| 8,181,720 B2 | 5/2012 | Frill et al. |
| 8,734,045 B1 | 5/2014 | Dine et al. |
| 9,267,549 B2 | 2/2016 | Dine |
| 10,458,185 B2 * | 10/2019 | Brand ................... F16C 43/04 |
| 2007/0092169 A1 | 4/2007 | Johnson |
| 2009/0028482 A1 | 1/2009 | Iwata et al. |
| 2011/0012455 A1 | 1/2011 | Scott |
| 2011/0064350 A1 | 3/2011 | Yamakawa et al. |
| 2015/0267745 A1 | 9/2015 | Gallimore et al. |
| 2016/0091024 A1 | 3/2016 | Foote |
| 2018/0187491 A1 | 7/2018 | Brand |

\* cited by examiner ns with thrust bearing
with enhanced torque

CROSS REFERENCE TO RELATED APPLICATIONS

This application is a Continuation Application of application Ser. No. 15/399,245 filed Jan. 5, 2017, which is incorporated by reference in its entirety.

BACKGROUND

1. Field of the Disclosure

The disclosure relates generally to mud motors for use in a drilling assembly for rotating a drill bit for drilling wells or wellbores.

2. Background Art

Wells or wellbores are formed for the production of hydrocarbons (oil and gas) trapped in subsurface formation zones. A drilling assembly (also referred to as a bottom hole assembly or "BHA") having a drill bit at end thereof is used for drilling wellbores. Certain drilling assemblies, such as those used for drilling deviated wellbores, utilize a drilling motor, commonly referred to as "mud motor", to rotates the drill bit to form such wellbores. The mud motor includes a rotor that rotates when a fluid, such as a drilling fluid (commonly known as "mud"), is passed under pressure through the mud motor. The rotor is connected to flexible shaft, which in turn is connected to a drive shaft that connects to the drill bit via a box connection. The drive shaft is supported by an axial bearing (commonly referred to as "thrust bearing"). Currently used thrust bearings include a number individual bearing stacks (often more than 10) that are axially abutted or stacked to form the thrust bearing. Each such individual bearing stack includes a set of rollers or balls placed inside two races. The thrust bearing rotates along with the drive shaft. The drilling assembly and thus the mud motor and the thrust bearing operate in very harsh environment, such as pressures over 10,000 psi and temperatures exceeding 200 degrees Fahrenheit. The drilling assembly and, thus, the thrust bearing, experience very high vibrations and whirl and other mechanical stresses during drilling. Because of the split races for each ball set in currently used thrust bearings, the torque transfer capability over the bearing stacks is limited due to slippage (friction contact) between the bearing stacks. Furthermore, slippage between bearing stacks can also cause wear and damage to the thrust bearing and adjacent parts to the thrust bearing.

The disclosure herein provides a mud motor that includes a thrust that addresses some of the above-noted deficiencies of currently used thrust.

SUMMARY

In one aspect, an apparatus for use in a wellbore is disclosed that in one non-limiting embodiment includes: a rotatable member, a thrust bearing coupled to the rotatable member, wherein the thrust bearing includes a bearing stack that includes unitary race member that includes a plurality of axially spaced inner races around an outer surface of the unitary race member, a set of bearing elements placed in each inner race in the plurality of inner races, and a separate outer race that secures each set of bearing elements in each inner race. In one embodiment, each space between adjacent outer races may be supported or enclosed by a support member made of at least two members for enabling assembly and disassembly of the bearing stack.

In another aspect, a method of assembling an apparatus for use in a wellbore is discloses that in one non-limiting embodiment includes: placing a first set of bearing elements in a first inner race made on an outer surface of a unitary race member having at least two inner races around a the outer surface of the unitary race member; enclosing the first inner race with the first set of bearing elements placed therein with a first outer race member; placing a first support member adjacent the first outer race member; placing a second set of bearing elements in a second inner race adjacent to the first inner race; and enclosing the second inner race with a second outer race member In yet another aspect, a method of drilling a wellbore is disclosed that in one non-limiting embodiment includes: conveying a drilling assembly in the wellbore that includes a mud motor that rotates a drive member configured to rotate a drill bit at an end of the drilling assembly, a thrust bearing coupled to the drive member, wherein the thrust bearing stack that further includes a unitary race member that contains a plurality of axially spaced inner races around an outer surface of the unitary inner race member, a set of bearing elements placed in each inner race in the plurality of inner races, and a separate outer race that secures each set of the bearing elements in each inner race; and drilling the wellbore by rotating the drill bit by the mud motor.

Examples of certain features of an apparatus and methods have been summarized rather broadly in order that the detailed description thereof that follows may be better understood, and in order that the contributions to the art may be appreciated. There are, of course, additional features that will be described hereinafter and which will form the subject of the claims.

DRAWINGS

For a detailed understanding of the apparatus and methods disclosed herein, reference should be made to the accompanying drawings and the detailed description thereof, wherein like elements are generally given same numerals and wherein.

DETAILED DESCRIPTION

Figure 1:
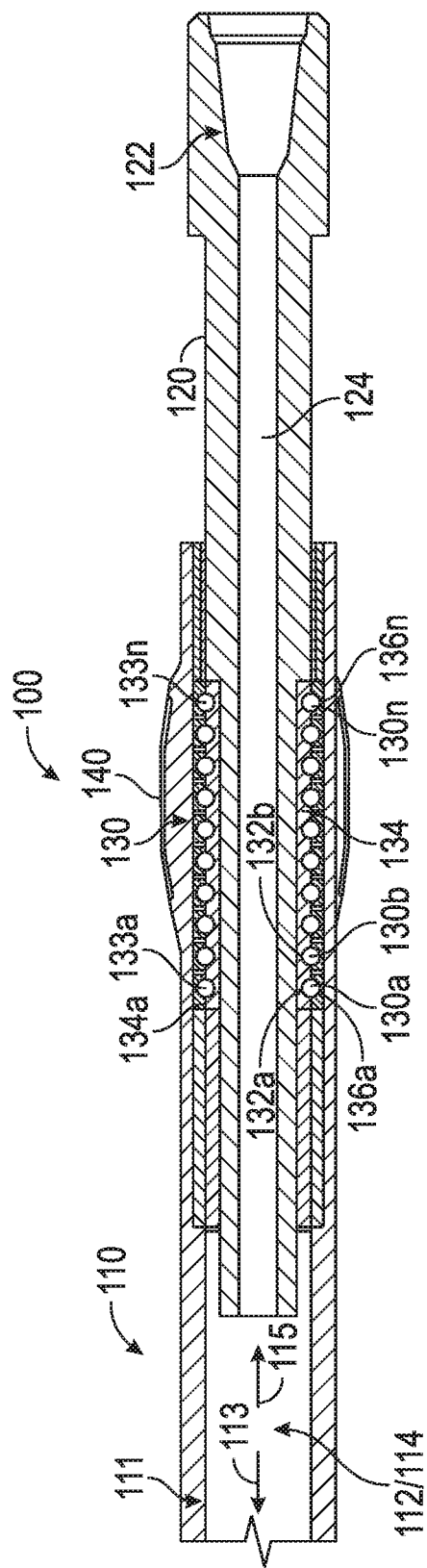
FIG. 1 shows a cross-sectional view of a section of an exemplary mud motor that includes a thrust bearing stack that contains a unitary member having a number of axially placed inner races that house bearing elements, made according to one non-limiting embodiment of the disclosure.

FIG. 1 shows a sectional view of portion of a drilling or mud motor 100 that includes an exemplary thrust bearing (also referred to herein as "thrust bearing assembly) 110 having a bearing stack (also referred to as the "thrust bearing stack") 130 made according to one non-limiting embodiment of the disclosure. The mud motor 100 forms a lower section of a drilling assembly that is connected to a drill pipe 113 to form a drill string. The mud motor 100 includes a housing 111 that houses a rotor 112 inside a stator 114 The rotor 112 connected to a drive shaft 120 (also referred to as the 'drive sub"). The drive shaft 120 has a box connection 122 at its end for housing a drill bit (not shown). The rotor 112 rotates inside the stator 114 when a fluid, such a drilling fluid (also referred to as the "mud") 115, is passed under pressure through the mud motor 100. The fluid 115 passes through a passage or bore 124 in the drive shaft 120 and discharges at the bottom of the drill bit. The wellbore is formed or drilled by rotating the drill bit by the mud motor and/or by rotating the drilling assembly, as is known in the art. The drive shaft 120 is supported by the thrust bearing 110 that includes the bearing stack 130. The bearing stack 130 is connected to the outside of the drive shaft 120 inside the housing 111. A stabilizer 140 is shown disposed around the housing 110. In one non-limiting embodiment, the bearing stack 130 includes a unitary race member 134 that has a number of axially spaced inner races or grooves 133a-333n disposed around the outer surface 134a of the unitary race member 134. A set of bearing elements, such as balls, is placed in each inner race. In FIG. 1, ball sets 130a-130n are shown placed in respective inner races 132a-132n as described in more detail in reference to FIGS. 2-5. Each inner race containing a set of balls is encased or secured by an outer race. In FIG. 1, outer races 136a-136n are shown respectively placed over inner races 132a-132n. Drilling assemblies and mud motors are well known in the drilling industry and are thus not described herein in more detail. Although the thrust bearing 110 is described herein in the context of a drilling apparatus, such a thrust bearing may be utilized around a rotatable member of any other apparatus to transfer torque from such member to another device or tool in the form shown and described herein or in an obvious variation thereof.

Figure 2:
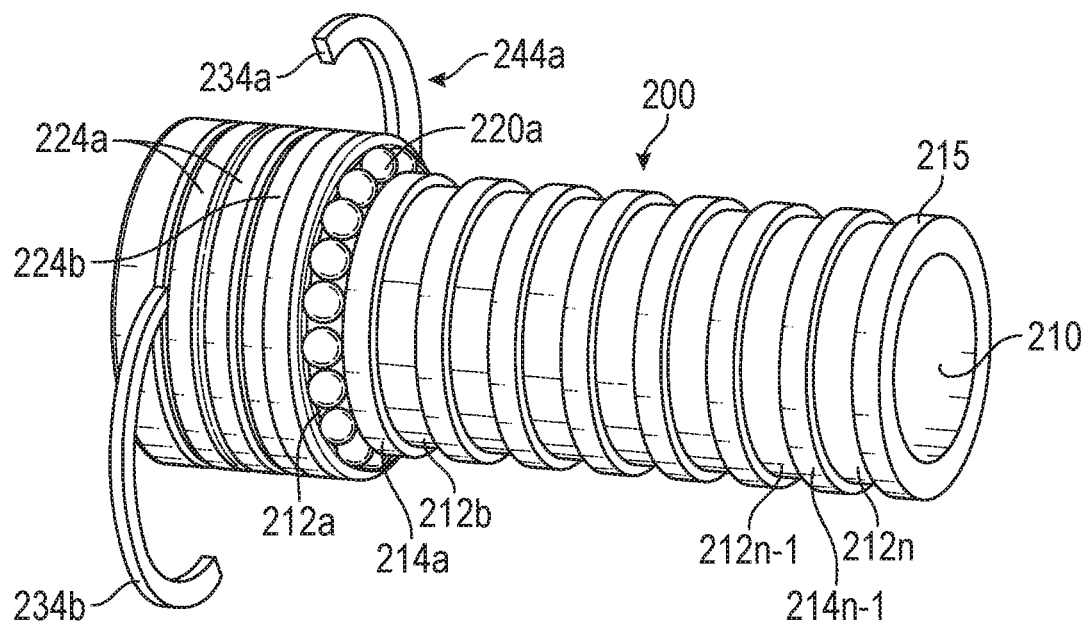
FIG. 2 shows an isometric sectional view of a partially assembled thrust bearing stack, according to one non-limiting embodiment of the disclosure

FIG. 2 shows an isometric view of a partially assembled thrust bearing stack 200 with an exposed view of a unitary body or a race member or housing 210, made according to one non-limiting embodiment of the disclosure. In one embodiment, the unitary inner race member 210 is a solid cylindrical member made from a suitable material, such as steel. In one aspect, the unitary inner race member 210 includes a number of grooves or races 212a, 212b through 212n (also referred to herein as "inner races") formed around the outer surface 215 of the unitary race member 210. In one embodiment, the inner races 212a-212n are axially spaced apart, separated by an equal space between the adjacent races. For example, in FIG. 2, space 214a separates inner races 212a and 212b, space 214b separates inner races 212b and 212c and space 214n-1 separates inner races 212n-1 and 212n. Each inner race includes a set of balls (bearing elements) around such inner race. FIG. 2 shows a set of balls 220a placed in the inner race 212a. Each inner race with its set of balls therein is enclosed by a corresponding outer race member that has a race along its inner surface to secure the set of ball therein, as described in detail in reference to FIG. 3. In FIG. 2, an outer race 224a made of two half shells 234a and 234b is shown for placement over the inner race 212a having balls 220a therein. Each set of balls enclosed between its inner race and outer race forms an individual stack of the thrust bearing stack 200, wherein such individual stacks or members are axially spaced to form the bearing stack 200.

Figure 3:
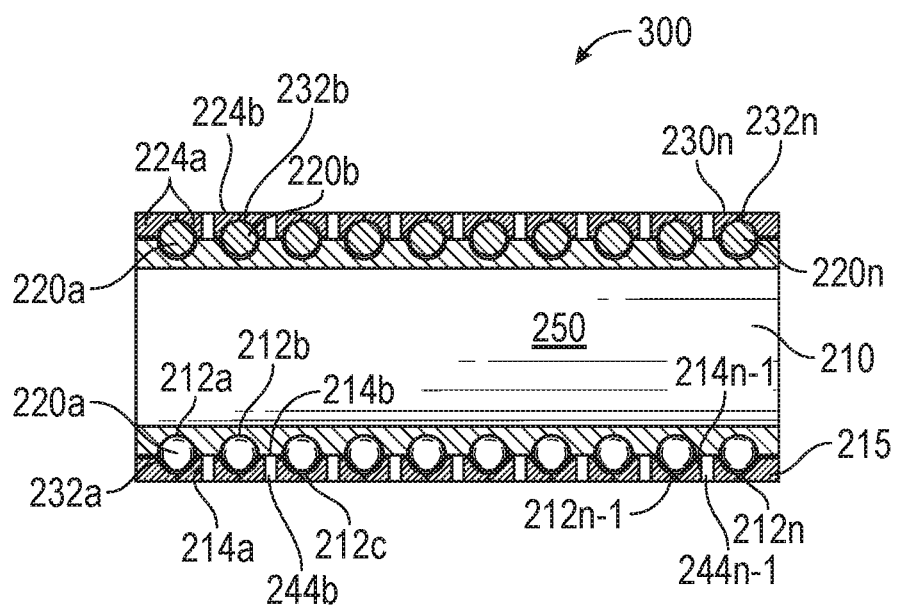
FIG. 3 shows an isometric view of an ally assembled thrust bearing stack, according to one embodiment of the disclosure.

FIG. 3 shows an isometric sectional view of an assembled thrust bearing stack 300 made according to one non-limiting embodiment for use in an apparatus, such as a mud motor 100 shown in FIG. 1. The thrust bearing stack 300 is shown to include a unitary inner race member 210 having a number of axially spaced grooves or inner races 212a-212n on the outside 215 of the unitary inner race member 210. Each of the inner races 212a-212n contains a set of balls In FIG. 3, a set of balls 220a is placed inside and around race 212a, a set of balls 220b inside and around inner race 212b and a set of balls 220n inside and around inner race 212n. Each of the inner races 212a-212n in the unitary inner race member 210 with its corresponding set of balls 220a-220n respectively installed therein is enclosed by a separate outer race member that has an inner groove (referred to herein as the outer race) along an inside surface of such outer race member configured to enclose the ball set in its corresponding inner race. In FIG. 3, an outer race member 224a having an outer race 232a encloses the balls 220a in the inner race 212a, an outer race member 224b having an outer race 232b encloses the inner race 212b having balls 220b therein and an outer race member 224n with an outer race 232n encloses the inner race 212n with balls 220n. therein. Each of the outer race members 224a-224n may be made by radially placing a number of circular sections or segments, such two or more circular segments for ease of placing and enclosing the balls during assembly process of the thrust bearing stack 300. A support member or a spaces is disposed in each space between adjacent outer race members. Referring to FIGS. 2 and 3, a support member 244a is shown placed around space 214a between adjacent outer race members 224a and 224b a, a support member 244b placed around space 214b between outer race members 224b and 224c and a support member 244n-1 between outer race members 2240n-1 and 224n. The unitary inner race member 210 includes a through passage 250. The thrust bearing stack 300 is disposed around the outside of the drive 120 of the mud motor 110 (FIG. 1) with the unitary inner race member 210 attached to the drive 120 so that when the drive 120 rotates, the unitary inner race member 210 along with the inner races 212a-212n rotates.

Referring now to FIGS. 2 and 3, the outer race members 224a-224n may be made of two or more pieces for ease of placing or enclosing the balls in the inner races during assembly of the thrust bearing stack 300. The support members 244a-244n-1 may also include two or more members for ease of assembling such members on the thrust bearing stack 300. In one embodiment, a support member may be in the form of two half shells, similar to element 234a and 234b of outer races in FIG. 2. Alternatively, all or some of the outer races may be formed inside unitary members (such as unitary shells), wherein a separate outer race corresponds to each of the inner races 212a-212n. Such an outer shell may be made of two or more members or pieces (such as half shells, quarter shells, etc.), wherein all such shells placed together over the unitary inner race member enclose all the sets of the bearing elements. Such a structure will not need the support members, as spacing between the outer races will fulfill the same function as the individual support members.

Figure 4:
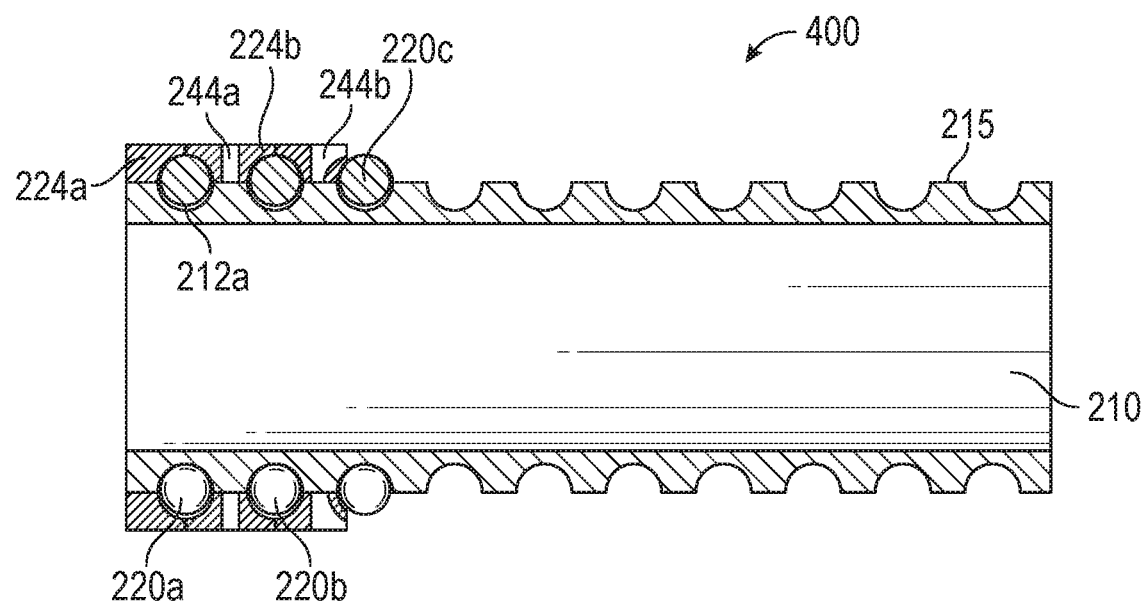
FIG. 4 shows a sectional view of the thrust bearing stack shown in FIG. 3.

FIG. 4 is a partial sectional view 400 of the thrust bearing stack 300 shown in FIG. 3 during the assembly and disassembly of the thrust bearing stack 300. A method to assemble the thrust bearing stack 300 may include: placing a first set of balls 220a in a first inner race 212a made on an outer surface 215 of a unitary inner race member 210 having a selected number of inner races 212a-212n around its outer surface 215; enclosing or securing the first set of balls 220a placed in the first inner race 212a with a first outer race 224a; placing a first support member 244a adjacent the first outer race member 224a; placing a second set of balls 220b in a second inner race 212b and enclosing the second inner race 212b with the second set of balls 220 placed therein with a second outer race 224b; and placing a second support member 244b adjacent to the second outer race member 224b. This process is continued till all the inner races have been filled with their respective ball sets and secured by their respective outer race members along with the support members placed in the spaces between adjacent outer race members. To disassemble the thrust bearing 400, the above process is utilized in reverse. The support members enable the disassembly of the thrust bearing by providing access to the ball sets during the disassembly process.

Figure 5:
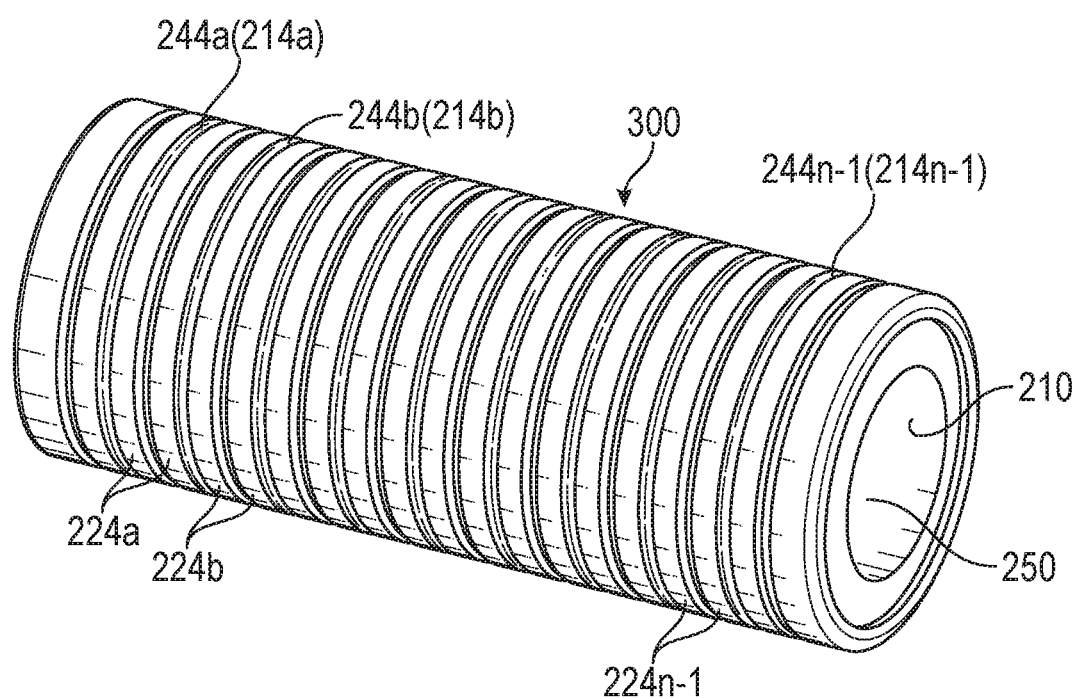
FIG. 5 shows an assembled thrust bearing stack shown in FIG. 1.

FIG. 5 shows an isometric view of a fully assembled thrust bearing stack 300 shown in FIG. 3. The thrust bearing 300 is shown to include the unitary inner race member 210 having a through inner bore 250. The outer races 224a-224n respectively enclose the ball sets 220a-220n in their respective inner races 212a-212n (hidden in FIG. 5). Support members 244a-244n-1 are shown placed in the spaces 214a-214n-1 between adjacent outer races 224a-224n. The thrust bearing disclosed herein having a bearing stack made according an embodiment of this disclosure can provide higher torque transfer compared to the currently used thrust bearings and reduce failures during drilling, such as cracking of the drive sub that includes the thrust bearing and break outs on the drive sub outside diameter caused by torsional movement in between the thrust bearing races.

The foregoing disclosure is directed to certain exemplary non-limiting embodiments of a drilling motor with a thrust bearing. Various modifications will be apparent to those skilled in the art. It is intended that all such modifications within the scope of the appended claims be embraced by the foregoing disclosure. The words "comprising" and "comprises" as used in the claims are to be interpreted to mean "including but not limited to". Also, the abstract is not to be used to limit the scope of the claims.

The invention claimed is:

1. A drilling motor, comprising:
   a drive shaft configured to rotate a drill bit;
   a thrust bearing coupled to the drive shaft, wherein the thrust bearing includes:
   a unitary inner race member that includes a plurality of axially spaced inner races around an outer surface of the unitary inner race member;
   a set of bearing elements placed in each inner race in the plurality of inner races; and
   a plurality of outer race members;
   wherein each outer race member encloses a corresponding inner race, and each outer race member secures the set of bearing elements in one inner race of the plurality of inner races,
   wherein each outer race member is made of two outer race pieces, and wherein a space exists between two outer race members and wherein a separate support member is placed in the space.

2. The drilling motor of claim 1, wherein the unitary inner race member is a solid member.

3. The drilling motor of claim 1, wherein each support member includes at least two members, each such member placed in the space between the outer race members.

4. The drilling motor of claim 3, wherein the at least two members are half shells that are in contact with their respective outer race members.

5. The drilling motor of claim 1, wherein the inner unitary member rotates with the drive shaft.

6. A drill string, comprising:
   a drilling assembly comprising:
   a drilling motor;
   a drive shaft rotated by the drilling motor to rotate a drill bit at an end of the drilling assembly; and
   a thrust bearing coupled to the drive shaft, the thrust bearing including:
   a unitary inner race member that includes a plurality of axially spaced inner races around an outer surface of the unitary inner race member;
   a set of bearing elements placed in each inner race in the plurality of inner races; and
   a plurality of outer race members;
   wherein each outer race member encloses a corresponding inner race, and each outer race member secures the set of bearing elements in one inner race of the plurality of inner races,
   wherein each outer race member is made of two outer race pieces, and
   wherein a space exists between two outer race members and wherein a separate support member is placed in the space.

7. The drill string of claim 6, wherein the unitary inner race member is a solid member.

8. The drill string of claim 7, wherein the support member includes at least two members placed in the space between the outer race members.

9. The drill string of claim 8, wherein the at least two members are half shells that are in contact with the two outer race members.

10. A method of assembling an apparatus for use in a wellbore, the method comprising:
    providing a unitary inner race member having a plurality of races around an outer surface thereof;
    placing a first set of balls in a first inner race of the plurality of inner races;
    enclosing the first inner race with the first set of balls placed therein with a first outer race member to secure the first set of balls in the first inner race, the first outer race member being made of at least two outer race pieces;
    placing a support member adjacent to the first outer race member;
    placing a second set of balls in a second inner race in the plurality of inner races;
    enclosing the second inner race with the second set of balls placed therein with a second outer race member to secure the second set of balls in the second inner race, the second outer race member being made of at least two outer race pieces, wherein the support member is adjacent to the second outer race member.

11. The method of claim 10, wherein the unitary inner race member is a solid member.

12. The method of claim 10, wherein the support member comprises two half shells.

13. A method of drilling a wellbore, comprising:
    conveying a drilling assembly in the wellbore that includes: a drilling motor that rotates a drive shaft that in turn rotates a drill bit at an end of the drilling assembly; a thrust bearing coupled to the drive shaft, wherein the thrust bearing includes a unitary inner race member that contains a plurality of axially spaced inner races around an outer surface of the unitary inner race member, a set of bearing elements placed in each inner race in the plurality of inner races, and a plurality of outer race members; wherein each outer race member encloses a corresponding inner race, and each outer race member secures the set of bearing elements in one inner race of the plurality of inner races, wherein each outer race member is made of two outer race pieces, and wherein a space exists between two outer race members and wherein a separate support member is placed in the space; and drilling the wellbore by rotating the drill bit by the drilling motor.

\* \* \* \* \*